(12) United States Patent
Braeuer

(10) Patent No.: US 11,209,088 B2
(45) Date of Patent: Dec. 28, 2021

(54) PERFORATED PLUG FOR A CONTROL VALVE

(71) Applicant: Samson Aktiengesellschaft, Frankfurt am Main (DE)

(72) Inventor: Anke Braeuer, Erlensee (DE)

(73) Assignee: SAMSON AKTIENGESELLSCHAFT, Frankfurt am Main (DE)

( * ) Notice: Subject to any disclaimer, the term of this patent is extended or adjusted under 35 U.S.C. 154(b) by 0 days.

(21) Appl. No.: 16/440,752

(22) Filed: Jun. 13, 2019

(65) Prior Publication Data

US 2019/0383404 A1 Dec. 19, 2019

(30) Foreign Application Priority Data

Jun. 14, 2018 (DE) .......................... 102018114316.8

(51) Int. Cl.
*F16K 3/314* (2006.01)
*F16K 3/26* (2006.01)
*F16K 47/04* (2006.01)

(52) U.S. Cl.
CPC ................ *F16K 3/314* (2013.01); *F16K 3/26* (2013.01); *F16K 47/04* (2013.01)

(58) Field of Classification Search
CPC ............. F16K 3/314; F16K 3/26; F16K 47/04
See application file for complete search history.

(56) References Cited

U.S. PATENT DOCUMENTS

| 1,802,897 | A | * | 4/1931 | Holden | ..................... F16K 3/34 251/210 |
| 3,602,261 | A | | 8/1971 | Brown et al. | |
| 3,773,085 | A | * | 11/1973 | Caldwell, Jr. | ........... F16K 47/04 137/630.15 |
| 3,821,968 | A | * | 7/1974 | Barb | ....................... F16K 47/04 137/625.3 |

(Continued)

FOREIGN PATENT DOCUMENTS

| DE | 2123163 A | 12/1972 |
| DE | 2361918 A1 | 6/1975 |

(Continued)

*Primary Examiner* — Matthew W Jellett
*Assistant Examiner* — Christopher D Ballman
(74) *Attorney, Agent, or Firm* — Steven M. Shape; Dennemeyer & Associates, LLC

(57) ABSTRACT

Control valves find one of their most important applications in control loops of process plants for controlling the flow rate of a gaseous or liquid medium. To this end, it is crucial that the flow rate can be reliably adjusted and that safe operation, especially with hazardous substances, can be guaranteed. To solve this problem, a hole pattern for perforated plugs (300) of control valves is proposed, which allows the densest possible arrangement of openings (220) on helical lines where the height of the helical lines is minimal and, at the same time, advantageous technical specifications and safety regulations can be taken into account. The pattern allows to generate a very smooth flow characteristic, which facilitates a reliable control of the flow rate. Moreover, the flow rate can be optimized such that the size of the moving parts of the control valve can be reduced to a minimum.

12 Claims, 6 Drawing Sheets

(56) References Cited

U.S. PATENT DOCUMENTS

Figure 1:
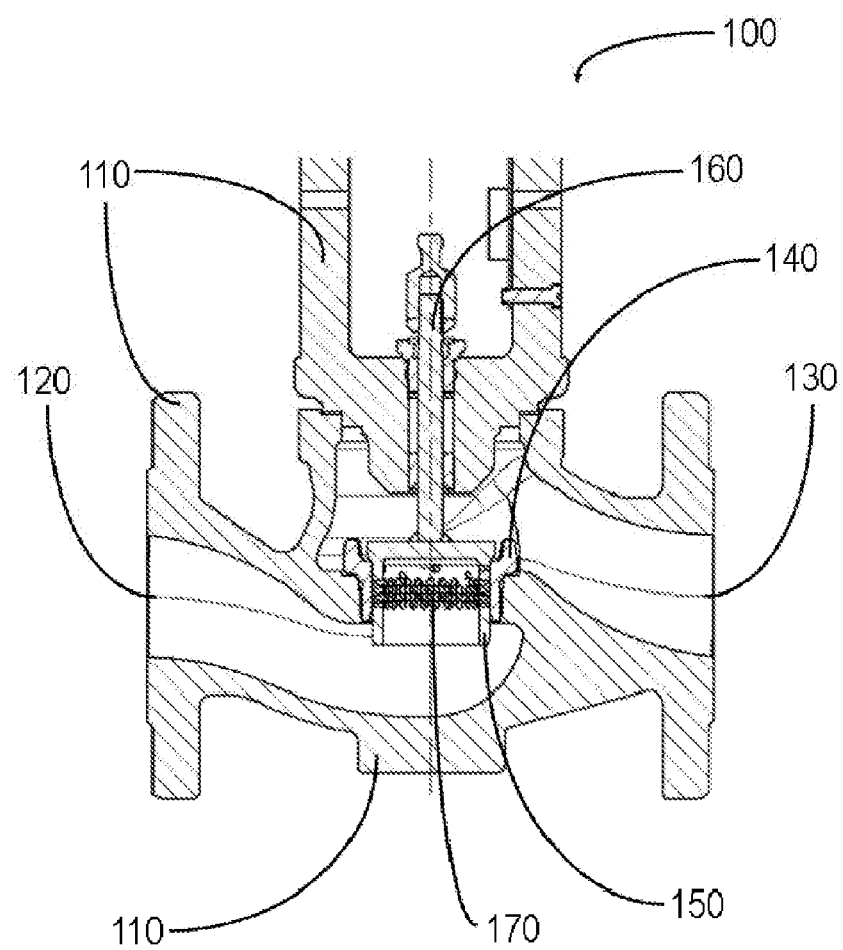

| Patent No. | | Date | Inventor | Classification |
|---|---|---|---|---|
| 3,990,475 | A * | 11/1976 | Myers | F16K 3/34 137/625.3 |
| 4,108,210 | A * | 8/1978 | Luthe | F16K 47/08 137/625.28 |
| 4,125,129 | A * | 11/1978 | Baumann | F16K 1/54 137/42 |
| 4,261,389 | A * | 4/1981 | Hager | B01J 4/001 137/625.38 |
| 4,375,821 | A * | 3/1983 | Nanao | F16K 3/26 137/239 |
| 4,573,492 | A * | 3/1986 | Tadokoro | F16K 3/265 137/239 |
| 4,921,014 | A * | 5/1990 | Tartaglia | F16K 47/08 137/494 |
| 5,012,841 | A * | 5/1991 | Kueffer | F16K 47/04 137/625.39 |
| 5,014,746 | A | 5/1991 | Heymann | |
| 5,018,703 | A * | 5/1991 | Goode | F16K 47/08 137/625.3 |
| 5,020,571 | A * | 6/1991 | Tartaglia | F16K 47/08 137/625.3 |
| 5,964,248 | A * | 10/1999 | Enarson | F01D 17/143 137/625.37 |
| 6,047,734 | A * | 4/2000 | Robinson | F16K 3/246 137/625.37 |
| 7,104,281 | B2 * | 9/2006 | Stares | F16K 3/246 137/625.33 |
| 8,104,511 | B2 * | 1/2012 | Reilly | F16K 31/0613 137/625.65 |
| 8,490,651 | B2 * | 7/2013 | Cheng | F16K 47/04 137/625.3 |
| 8,910,661 | B2 * | 12/2014 | Griffin, Jr. | F16K 3/0209 137/625.3 |
| 9,528,632 | B2 * | 12/2016 | Glaun | F16K 47/08 |
| 9,587,764 | B2 * | 3/2017 | Juhnke | F16K 47/08 |
| 10,871,243 | B2 * | 12/2020 | Sander | F16K 47/08 |
| 2005/0116191 | A1 * | 6/2005 | Karlebratt | F16K 47/04 251/282 |
| 2009/0026395 | A1 * | 1/2009 | Perrault | F16K 47/08 251/127 |
| 2010/0319799 | A1 | 12/2010 | McCarty | |
| 2015/0048267 | A1 * | 2/2015 | Baumann | F16K 3/265 251/120 |
| 2016/0341335 | A1 * | 11/2016 | Adams | F16K 3/246 |
| 2017/0009906 | A1 * | 1/2017 | Nitta | F16K 3/26 |

FOREIGN PATENT DOCUMENTS

| | | |
|---|---|---|
| DE | 2416064 A1 | 10/1975 |
| DE | 3101494 A1 | 12/1981 |
| DE | 102012215530 A1 | 3/2014 |
| DE | 102015016902 A1 | 6/2017 |
| DE | 102016101547 A1 | 8/2017 |
| WO | 2017165181 A1 | 9/2017 |

* cited by examiner

PERFORATED PLUG FOR A CONTROL VALVE

CROSS-REFERENCE TO RELATED APPLICATIONS

This application claims priority to German application 102018114316.8, filed Jun. 14, 2018, which is hereby incorporated by reference in its entirety.

FIELD OF THE INVENTION

The invention relates to the design of hole patterns for closure members of control valves, in particular for cup-shaped closure members, which are also referred to as perforated plugs.

Background of the Invention

Control valves facilitate a precise and reliable regulation of a desired flow rate of a gaseous or liquid medium (fluid). They find one of their most important applications as regulating elements in control loops of process plants. A control valve consists of a housing with at least one inlet and one outlet for a fluid medium, a valve seat which forms the flow-through opening of the valve, and a closure member for controlling the flow rate.

Description of Related Art

There are different types of control valves. In DE 10 2016 101 547 A1, a control valve is described where the flow rate is controlled by means of a cup-shaped closure member or perforated plug. The perforated plug is guided in an annulus and has openings in its lateral wall. The corresponding hole pattern is divided into two areas, with small openings in a first part and large openings in a second part. When the perforated plug is pulled out of its shut-off position, i.e. the position where the valve is completely closed, the small openings are first enabled for the flow of the fluid. The flow rate is strongly reduced at these valve positions. Furthermore, the openings are arranged in rows that are horizontally oriented to the axis of the perforated plug. Thus, the flow rate increases when a row is being enabled and remains virtually unchanged when no row is being enabled. Such an irregular increase represents a problem for many process applications where the flow rate must be adjusted reliably over a wide range, from small to large flow rates.

When the perforated plug is pulled out further beyond a certain position, the fluid can flow through the large openings. At this position, the flow rate increases even more irregular than due to the horizontal arrangement of the rows. This position also marks the transition to an area where the flow rate depends linearly on the position of the perforated plug. For many applications, however, an equal percentage dependence according to the standard DIN EN 60534-2-4: 2009-2011 is needed.

In DE 10 2015 016 902 A1, a control valve is described where openings are integrated in the lateral wall of a tubular valve seat. As in the previous example, the corresponding hole pattern consists of an area with small openings and an area with large openings. In addition, there are compensating channels that facilitate a smoother transition between the two areas. The hole pattern in the area of the small openings exhibits horizontal rows. As described above, this leads to irregularities in the flow characteristic. Moreover, the hole pattern within the two areas changes only slightly, i.e. if the valve position changes in these areas, the same area is enabled for the flow of the fluid medium. This leads to an almost linear dependence of the flow rate on the valve position that can deviate strongly from an equal percentage behavior.

A control valve where the hole pattern is not based on horizontal rows has been disclosed in DE 31 01 494 A1. The corresponding perforated plug is guided in an annulus. It is shaped like a cup and has openings in its lateral wall. The openings are arranged along a helical line. When the plug is pulled out, the openings are enabled one after the other, resulting in a much smoother flow characteristic as compared to the horizontal row arrangement. However, the distances between the openings are relatively large such that the maximum possible flow rate is not reached. In addition, when the perforated plug is lifted by an increment, the same area is enabled for the flow of the medium always, resulting, again, in a linear flow characteristic and not an equal percentage one.

A similar hole pattern can be seen in the valve seat of the control valve described in WO 2017/165181 A1. The openings are arranged on significantly more than one helical line. In addition, they are aligned in vertical rows and touch each other. The regular hole pattern again leads to an almost linear flow characteristic, which can deviate strongly from an equal percentage flow characteristic. In addition, touching of the openings is out of the question for many applications in which, for example, hazardous substances such as oxygen are used. Here a minimum distance between the openings must be maintained such that, for reasons of mechanical stability, the web between the openings must not fall below a certain width.

OBJECT OF THE INVENTION

It is therefore an object of the present invention to provide hole patterns for cup-shaped perforated plugs of control valves which facilitate both the handling of hazardous substances such as oxygen and the reliable operation of the valve at small as well as large flow rates.

BRIEF SUMMARY OF THE INVENTION

The object is achieved by the invention as claimed in the independent claims. Advantageous embodiments are described in the dependent claims. The wording of all claims is hereby included in this description by way of reference.

The use of the singular form should not exclude a possible multiplicity and vice versa, except for cases where it is explicitly stated.

In the following, individual method steps are described in more detail. The steps do not necessarily have to be performed in the order indicated. The method to be detailed below may also include other steps that are not explicitly mentioned.

To solve the problem, a method for manufacturing a perforated plug for a control valve is proposed, where the perforated plug is cup-shaped and has openings in its lateral wall. The openings are arranged on at least one helical line around the lateral wall of the perforated plug in order to obtain a flow characteristic of the control valve that is as smooth as possible. This enables simple and reliable control protocols of the flow rate.

The openings and helical lines are arranged such that the ratio of the maximum web width and the minimum web width between adjacent openings is greater than or equal to 1 and less than or equal to 1.5. This condition ensures that the openings are as close as possible to each other and that the maximum possible flow rate is achieved. The size of the valve seat can thus be reduced to a minimum and the control valve can be operated reliably and safely at high pressures.

In order to further increase the smoothness of the flow characteristic, the number of the helical lines is kept as low as possible, taking into account the previously described conditions on the web width, other technical specifications and safety regulations. These include the inner diameter of the perforated plug, the diameter of the openings and the minimal width of a web between adjacent openings. On the one hand, this enables the operation with hazardous substances and, on the other hand, offers the possibility to consider technical aspects during the production of control valves. The production of perforated plugs according to the invention can thus be carried out in a simple and cost-effective way.

Typically, a regular arrangement of the starting points of the helical lines leads to the best result, i.e. the lowest height of the helical lines and the smoothest possible arrangement of the openings.

The hole pattern described so far is very regular and produces an almost linear flow characteristic. When manufacturing the perforated plug, however, openings can be omitted in order to create a different course of the flow characteristic. This course can be adapted, for example, to the specifications and operational characteristics of the control loop in which the control valve is used. The omission of openings represents a very simple and cost-effective method of adapting the flow characteristic of a control valve to a predefined course.

In many applications an equal percentage course according to the standard DIN EN 60534-2-4:2009-2011 is needed. This increases, in particular, the accuracy of the flow control close to the shut-off position of the control valve.

The arrangement of the openings on helical lines allows a smooth increase of the flow rate with the valve position. The smoothness is more pronounced for smaller heights of the helical lines. This suggests the use of a single helical line. However, this is often at odds with the predefined technical boundary conditions and, in many cases, does not allow to further optimize the maximum possible flow rate. In many cases, the use of two or more helical lines is therefore preferable.

However, the number of helical lines cannot be increased at will without jeopardizing the smoothness of the flow characteristic. Increasing the number of the helical lines leads inevitably to an increase of their height. In the extreme case, this leads to an arrangement of the openings on horizontal and/or vertical rows, including the corresponding fluctuations in the flow rate when a row is enabled or no row can be enabled. A limitation to a maximum of 20 helical lines can therefore be useful.

In many cases, it is advisable to distribute the openings uniformly along the helical lines. On the one hand, this increases the smoothness of the flow characteristic and, on the other hand, allows the openings to be arranged as close as possible and, thus, the flow rate to be increased.

The latter applies in particular if the openings are arranged equidistantly on the helical lines.

In addition to the arrangement of the openings, their shape can also be taken into account during optimization processes. Circular openings can be produced comparatively easily by drilling holes. Another advantage of circular openings is their mechanical stability. In cases where the flow rate is of primary importance, other shapes are preferable. With the help of square, rectangular and hexagonal shapes, the area of the openings can be enlarged while maintaining a minimum web width. Star-like shapes can be useful to retain foreign bodies that may be in the fluid medium and exceed a certain radius.

The number of helical lines, for example, can be determined using an iterative method. To this end, an arrangement of the openings with N=2 helical lines with a minimum height $h=\pi D \tan(\alpha)$ can be selected first, where the angle $\alpha$ is determined by $\sin(\alpha)=N \cos(30°) (d+s)/(\pi D)$, the inner diameter D of the perforated plug, the diameter d of the openings, and the minimum web width s between the openings. The number of openings on each helical line is first given by the integer value of the ratio $\pi D/(d+s)$. It is gradually increased until the orthogonal projection of the position of one opening onto the nearest helical line falls in the intermediate area of two adjacent openings, i.e. the distance of the projection to the positions of the openings is at least 30% of the distance between the openings. It is then checked whether the web widths comply with the prescribed minimum value and whether the maximum ratio of two web widths is greater than or equal to 1 and less than or equal to 1.5. If this is not the case, the number of helical lines is increased and the steps described above are repeated. In this way, the number of helical lines, which facilitates an arrangement of the openings that is as close as possible, can be determined. The method is flexible and automatically adapts to the predefined boundary conditions.

In typical applications, the maximum total area of the openings is also predefined as a boundary condition.

The openings that are omitted during the production of the perforated plug to adapt it to a predefined course can be determined by means of a loop-type method. For an equal percentage dependence of the flow rate on the valve position, a complete hole pattern is first determined according to the method described above. The next step is to determine the total number of openings to be omitted. For this purpose, the number of openings necessary to obtain a predefined maximum total area of openings is determined. This number is subtracted from the maximum possible number of openings contained in the complete hole pattern. With the help of this difference r, the number of openings to be omitted on the individual helical lines is determined in a loop that begins with the Nth helical line and ends with the first helical line. In the first step, i=N is selected and the integer value of the ratio $3 r/(2 i-2)$ is determined, and is additionally decreased by 1. Subsequently, r is lowered by this value and the procedure repeated for the next helical line. This ensures that the number of openings to be omitted neither increases nor becomes greater than the total number r.

The object is further solved by a perforated plug for a control valve obtained by one of the methods described above.

The object is also solved by a perforated plug for a control valve, which has the properties described above.

Further details and features can be found in the following description of preferred embodiments in conjunction with the dependent claims. Here, the respective features can be realized on their own or in combination with each other. The possibilities to solve the object are not limited to the embodiments. For example, range specifications always include all—not explicitly mentioned—intermediate values and all conceivable sub-intervals.

Figure 2:
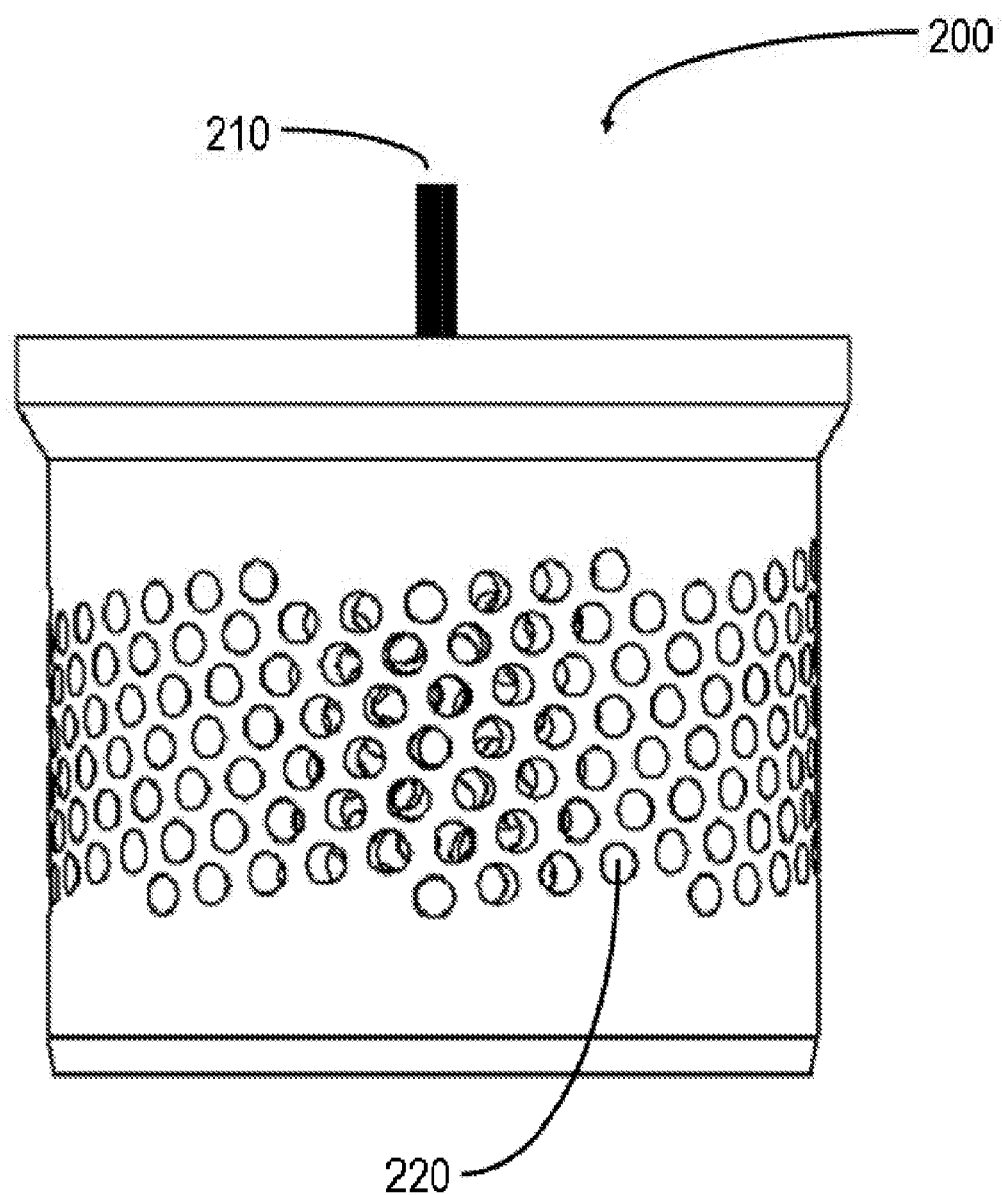
Figure 3:
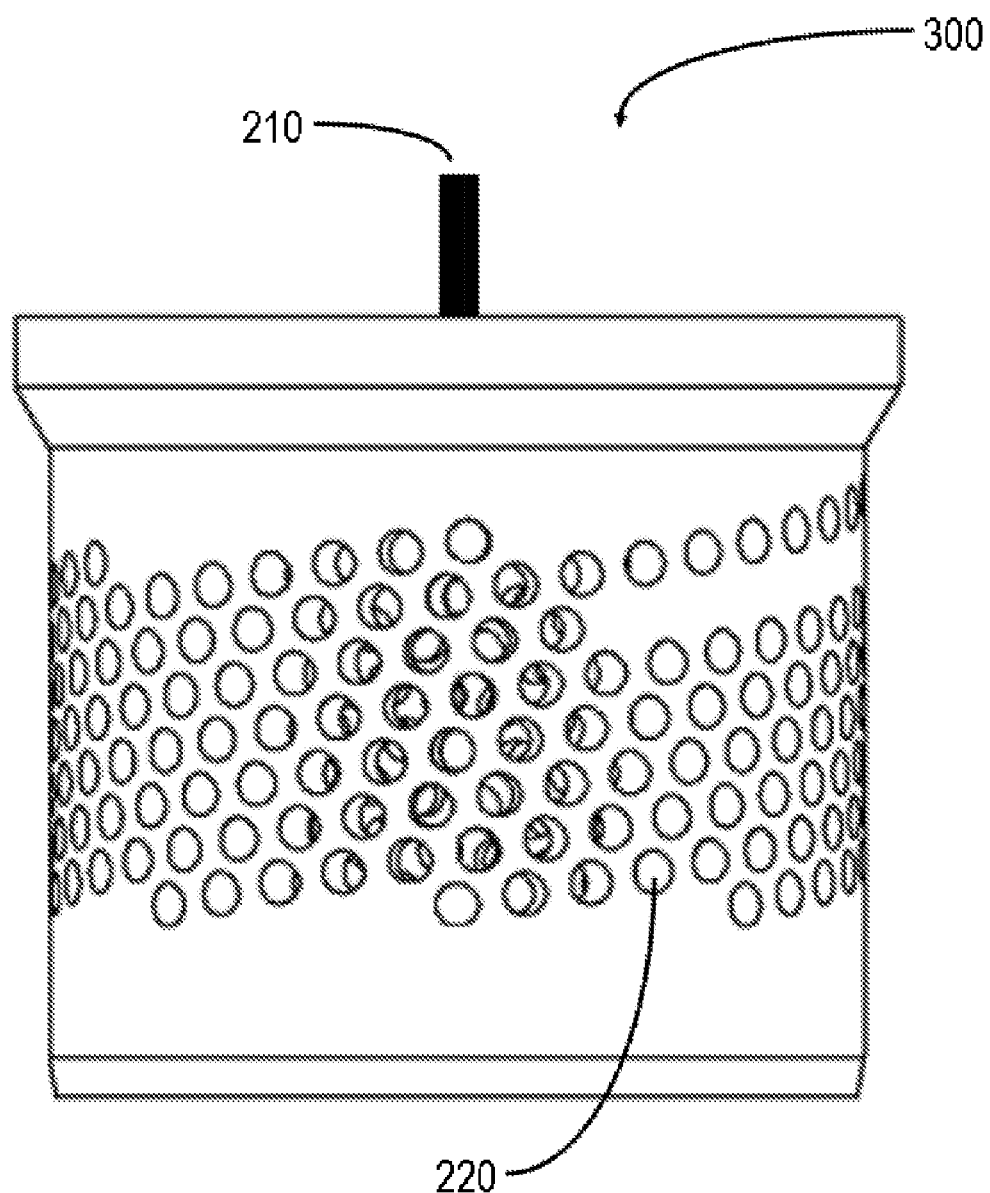
Figure 4:
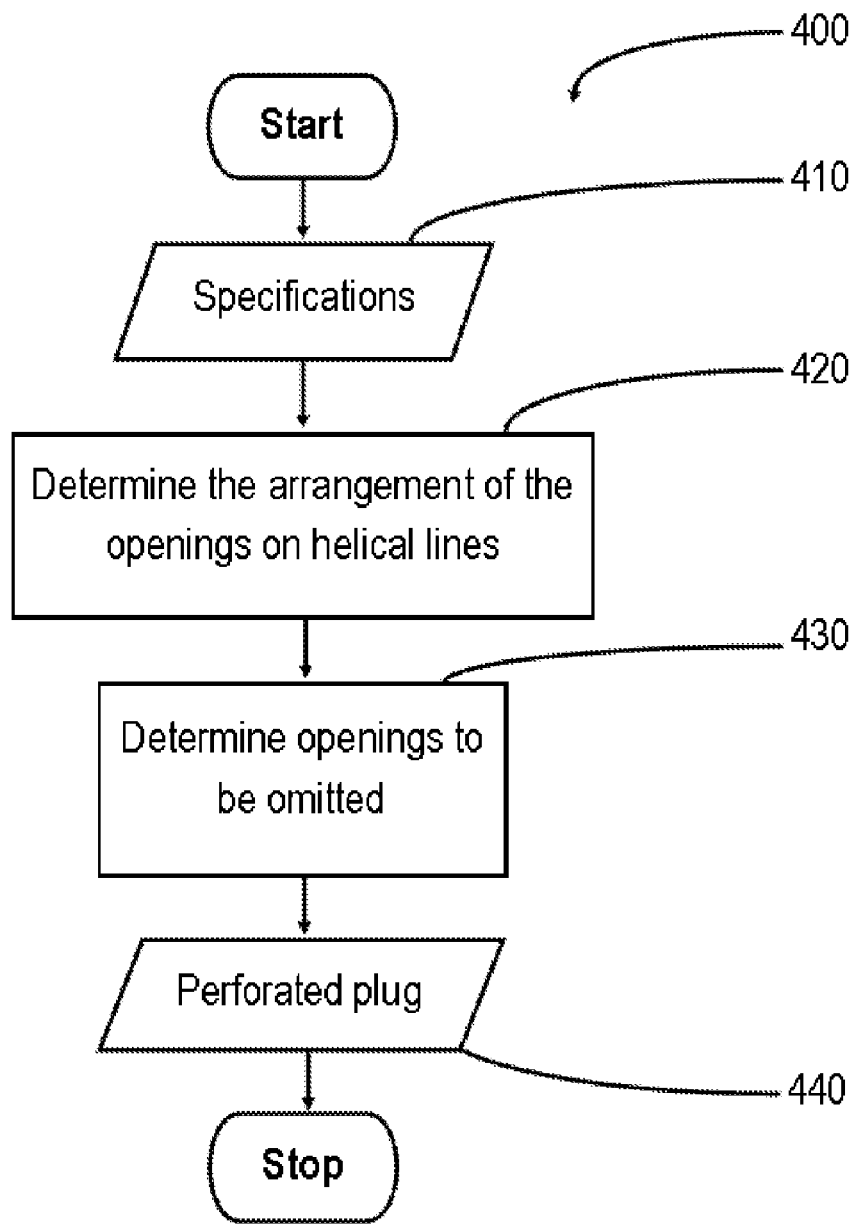
Figure 5:
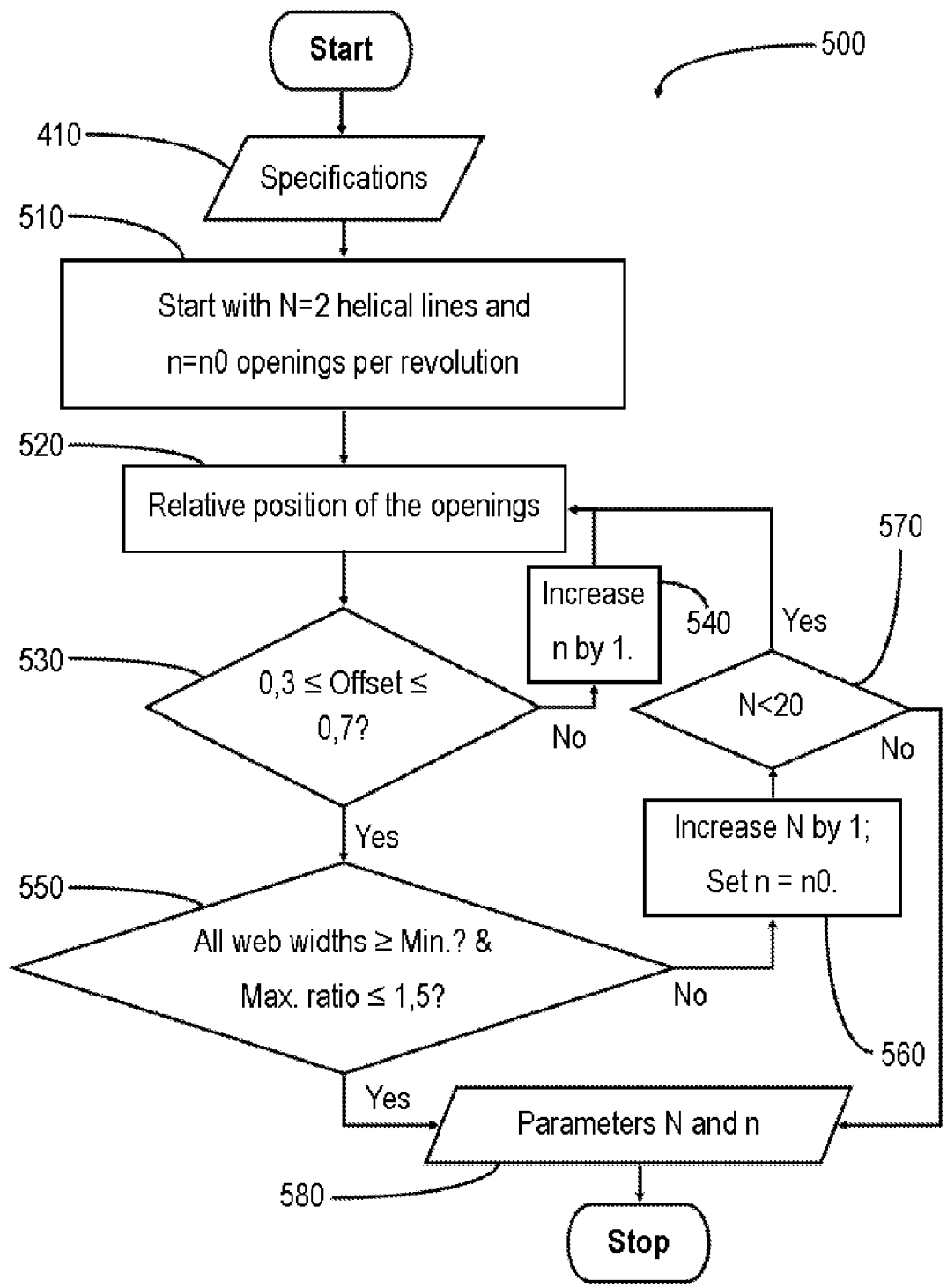
Figure 6:
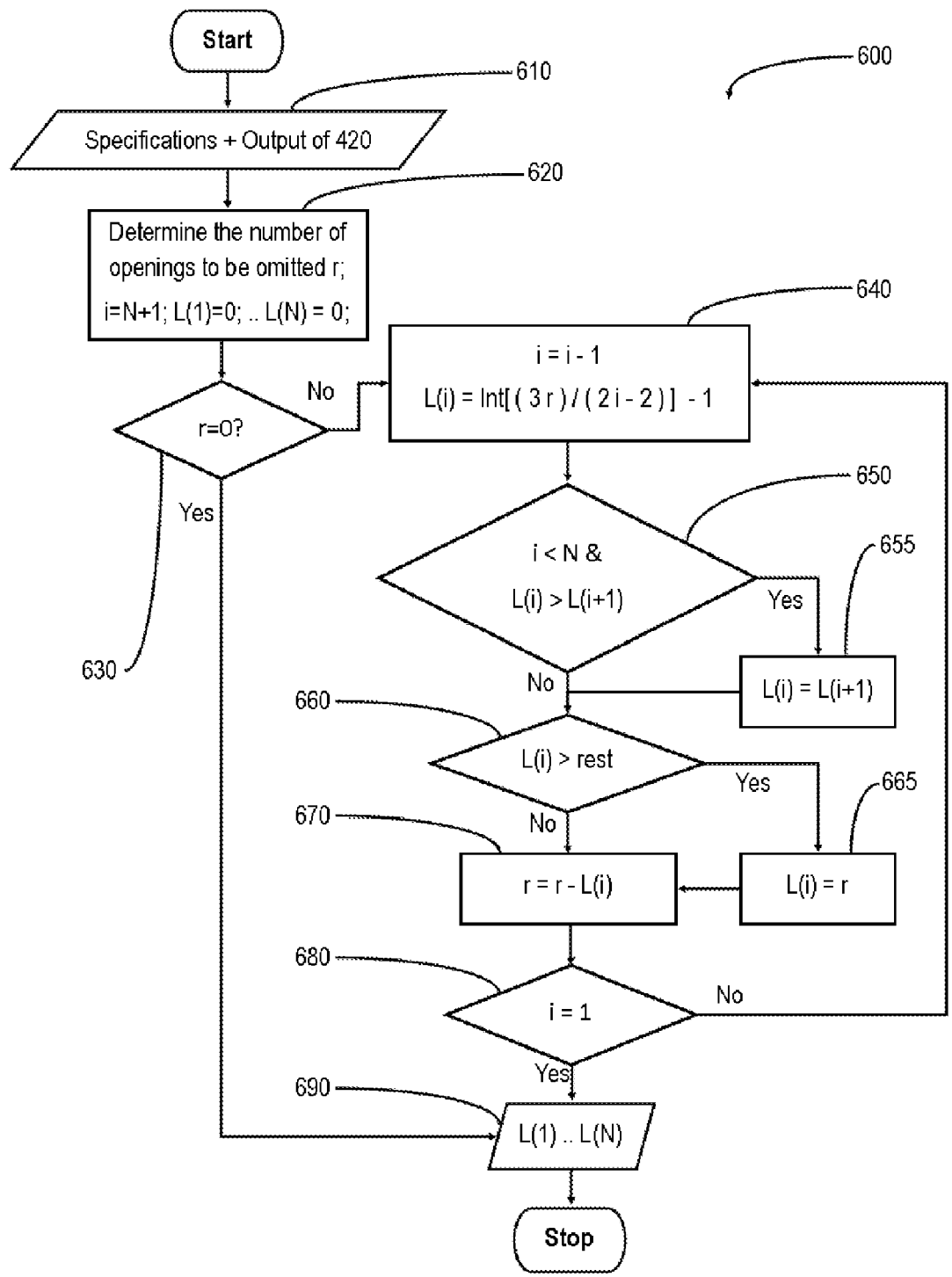

The embodiments are shown schematically in the figures. Equal reference numerals in the individual figures designate functionally same or similar and/or concerning their functions corresponding or equivalent elements. In detail, it is shown by:

FIG. 1 a control valve with a cup-shaped perforated plug;

FIG. 2 a schematic representation of a cup-shaped perforated plug having a hole pattern in accordance with the invention;

FIG. 3 a schematic representation of a cup-shaped perforated plug with a hole pattern in accordance with the invention, where openings are omitted;

FIG. 4 flow chart of a method which can be used to manufacture a perforated plug according to the invention;

FIG. 5 flow chart of a method which can be used to produce a hole pattern according to the invention; and FIG. 6 a flow chart of the method which can be used to identify openings that are to be omitted during the manufacture of the perforated plug.

FIG. 1 shows a control valve 100 consisting of a valve housing 110, an inlet 120, an outlet 130 and a valve seat 140. In the valve seat 140, a cup-shaped perforated plug 150 is guided by means of a valve rod 160. The perforated plug 150 is shown in the figure in the shut-off position, i.e. a position where the perforated plug 150 completely closes the flow-through opening defined by the valve seat 140. The perforated plug 150 has openings 170. When the perforated plug 150 is pulled out of the valve seat 140, the openings 170 are gradually enabled for the flow of the fluid medium. In this way, the flow rate of a fluid medium through the control valve 100 can be controlled.

FIG. 2 shows a cup-shaped perforated plug 200 with a holder 210. With the aid of the holder 210, the perforated plug 150 can be firmly connected to the valve rod 160 of the control valve 100. The perforated plug 200 has circular openings 220, which are in the lateral wall of the perforated plug 200. The openings 220 are arranged on helical lines and offset from each other in such a way that the openings 220 are arranged in the densest possible way. The maximum total area for the flow of the fluid medium, which can be achieved by taking into account the shape and size of the openings 220 and the prescribed minimum web width, is thus available. Since the hole pattern changes only slightly along the perforated plug 200, it produces an almost linear flow characteristic. Significant deviations from the linear behavior of the flow rate with the valve position can only occur close to the shut-off position or in valve positions that correspond to a maximally opened valve.

The perforated plug 300, which is illustrated in FIG. 3, generates an equal percentage flow characteristic. The hole pattern of the perforated plug 200 was used and openings 220 were determined which were omitted during the manufacture of the perforated plug 300.

FIG. 4 represents the basic steps of the method 400 for the manufacture of a perforated plug according to the invention. The inner diameter and the height of the perforated plug, the size of the openings and the total area of all openings as well as the minimum web width between adjacent openings represent specifications which are read in step 410—e.g. with the help of an input mask. In step 420, the parameters for arranging the openings on helical lines are determined. An iterative method can be used for this purpose, which is described in more detail in FIG. 5. The hole pattern generated in 420 is optimized with regard to the predefined boundary conditions, the smoothness of the flow characteristic and the flow rate. The resulting flow characteristic is almost linear. It can be adapted to a different course in step 430 by identifying openings that can eventually be omitted during the manufacturing process 440. A detailed method for the determination of such openings is described in connection with FIG. 6.

FIG. 5 shows the flow chart of an example method 500 for determining 420 parameters that define the number and the course of the helical lines and the arrangement of openings 220 on the helical lines. First, the entries from step 410 are taken over and converted into a hole pattern with N=2 helical lines in step 510. The starting points of the helical lines are selected such that they are equidistantly distributed around the circumference of the lateral wall of the perforated plug. The height h of the helical lines after a complete revolution around the inner wall of the perforated plug is given by $h=\pi D \tan(\alpha)$, where the angle $\alpha$ is determined by $\sin(\alpha)=N\cos(30°)(d+s)/(\pi D)$, the inner diameter D of the perforated plug, the diameter d of the openings 220 and the minimum web width s between the openings 220. In addition, the openings 220 are arranged equidistantly on the helical lines, with an opening 220 assigned to each starting point of a helical line. The number n of openings 220 lying on a helical line per revolution is given by a value n0, which corresponds to the integer value (rounding off) of the ratio $\pi D/(d+s)$. In step 530, the position of one of the openings 220 is mapped by orthogonal projection onto an adjacent helical line and the distances from the base point of the projection to the two openings closest to the base point along the helical line are determined. If one of these distances is less than 30% of the distance between the two adjacent openings, the number n is increased by 1 in step 540 and the method continued with step 530. If the projection of the position is not too close to the openings, step 550 checks whether all resulting web widths are greater than or equal to the minimum web width s and the maximum ratio that can be made with two web widths is greater than or equal to 1 and less than or equal to 1.5. If this is not the case, the number of helical lines is increased by 1 and n is reset to n0 in step 560. In step 570, it is then checked if N<20. If this is the case, the method is continued at step 530. In all other cases, the number of helical lines N and the number n of openings 220 are output in step 580.

FIG. 6 shows the flow chart for a loop-type method 600 to determine the openings that can be omitted in the manufacture of a perforated plug to produce an equal percentage flow characteristic of a control valve 100. In step 610, the method adopts the specifications from step 410 and the parameters from step 580. In step 620, two numbers are first determined on the basis of these data: 1) the maximum possible number of openings that can be arranged in horizontal rows around the lateral wall of the plug and 2) the number of openings required to obtain the required total area for the flow of the fluid medium. The difference between these numbers indicates the number r of openings to be omitted. In addition, a counting variable i is initialized and set to the value N+1. Furthermore, an array of numbers L(1) to L(N+1) is defined, whose values are first set to 0. In step 630, the system first checks whether there are any openings to be omitted and aborts the method with a corresponding output. If r>0, r is reduced by the value L(i) in step 640. Moreover, the count variable i is reduced by 1 and L(i) is assigned the integer value of the ratio 3r/(2i−2) that is reduced, in addition, by 1. In steps 650 and 655, the system now checks whether the number L(i) is greater than L(i+1) and, if necessary, sets it to the smaller value, unless the loop has just been started. A similar procedure is followed in steps 660 and 665, where it is checked whether L(i) is greater than r. In step 670, the number r is reduced by L(i). If the count variable equals 1, the method is continued with step 680 to output 690 the numbers L(1) to L(N) and then terminated. Otherwise, the method continues with step 640. The first L(i)

openings of the ith helical line are omitted during the subsequent fabrication of the perforated plug in step 440.

Adjacent Openings

The six openings with the smallest web widths to an opening under consideration are referred to as adjacent openings to the opening under consideration. If the maximum web width does not change within the set of adjacent openings, the adjacent openings may include more than six, e.g. eight, openings.

Flow Characteristic

The flow characteristic of a control valve describes the functional relationship between the position of a valve controller—e.g. the position of a closure member—and the flow rate resulting from the position of the valve controller.

Flow Rate

The flow rate is the quantity of a fluid medium which moves through a certain cross-section in a certain unit of time. The quantity of the medium can be specified as the amount of substance. For metrological reasons, however, it is stated in a unit of volume or mass in many cases.

Equal Percentage Flow Characteristic

A control valve has an equal percentage flow characteristic if a change in the valve controller position always results in the same percentage change of the flow rate. Accordingly, an equal percentage course of the flow characteristic corresponds to an exponential course. The term is defined in the standard DIN EN 60534-2-4:2009-2011, where the scope of the equal percentage dependence is limited to measurable changes, i.e. the corresponding exponential dependence must only be guaranteed in the range from 20% to 100% of the fully opened valve. In valve controller positions below 20%, the flow rate may deviate from the equal percentage dependence, especially if the closure member closes the valve completely.

Cup

A cup consists of a tube which is open on one side and closed on the other by a base or lid.

Linear Flow Characteristic

A valve exhibits a linear flow characteristic if a change in the valve controller position by a given amount always leads to the same change in the flow rate, i.e. to the same change in the quantity of substance, volume or mass.

Hole Pattern

A hole pattern describes the geometric arrangement of openings or holes on a surface. Hole patterns are used, for example, to describe perforated sheets, perforated plates, perforated bricks or perforated plugs.

Perforated Plugs

Perforated plugs are cup-shaped closure members of control valves. They have openings in their lateral wall through which a fluid can flow.

Helical Line

A helical line is a constant height curve that winds around the lateral surface of a cylinder.

Web Width

The web width is the minimum distance between the edges of adjacent openings.

Control Valve

Control valves, also known as process or regulation valves, are used to throttle or control fluid flows. To this end, a closure member is moved within a flow-through opening of a valve seat by means of a drive. This enables the flow-through opening to be enabled or closed, which changes the flow rate, including a complete closure of the flow-through opening. Typically, a pneumatic or electric actuator is used for this purpose.

REFERENCE NUMERALS

100 Control valve with a cup-shaped perforated plug
110 Valve housing
120 Inlet
130 Outlet
140 Annular valve seat
150 Cup-shaped perforated plug
160 Valve rod
170 Openings in the lateral wall of the perforated plug 150
200 Perforated plug with a hole pattern according to the invention
210 Holder
220 Circular Opening
300 Perforated plug with a hole pattern according to the invention where openings 220 are omitted
400 Schematic representation of a method to manufacture a perforated plug according to the invention
410 Input of predefined technical parameters and boundary conditions
420 Determination of the parameters for the helical lines and the arrangement of the openings
430 Determination of the openings to be omitted
440 Manufacture of the perforated plug with the hole pattern that was determined in steps 420 and 430
500 Flow chart of an example method to determine the parameters of the helical lines and the arrangement of the openings 220
510 Setting up a hole pattern with two helical lines and n0 openings 220
520 Determination of the relative position of the openings 220 on the helical lines
530 Query whether the relative position of the openings 220 is in accordance with the invention
540 Increase of the number of openings 220 on a helical line by 1 if the result of the query 530 was negative
550 Query whether the web widths meet the required boundary conditions
560 Increase of the number of helical lines by 1 if the query 550 was negative
570 Query whether the number of helical lines is greater than 20
580 Output of the determined parameters
600 Flow chart of an example method for the determination 430 of openings which can be omitted during the manufacture of a perforated plug according to the invention
610 Input of the predefined technical parameters and boundary conditions and takeover of the parameters outputted in 580
620 Determination of the total number of openings to be omitted
630 Query whether no openings are to be omitted
640 Determination of the number of openings to be omitted along the i-th helical line
650 Query whether the number of openings to be omitted has increased
655 Set the number of openings to be omitted to the previous value if the query 650 was positive
660 Query whether the number of openings to be omitted is greater than the remaining total number
665 Set the number of openings to be omitted to the previous value if the query 660 was positive
670 Reduce the total number of openings to be omitted 680 Query whether all helical lines were considered
690 Output of the numbers indicating the openings to be omitted per helical line.

REFERENCES CITED

Patent Literature

DE 10 2016 101 547 A1
DE 10 2015 016 902 A1
WO 2017/165181 A1
DE 31 01 494 A1
DE 24 16 064 A1

Non-Patent Literature

The DIN standard DIN EN 60534-2-4:2009-2011

The invention claimed is:

1. A method for manufacturing (440) a perforated plug (150; 200; 300) for a control valve (100), the control valve (100) being capable of controlling the flow of a fluid,
wherein the perforated plug (150; 200; 300) is cup-shaped and has a lateral wall forming a plurality of openings (170; 220) through which the fluid is able to flow;
wherein the plurality of openings (170; 220) are arranged on at least one helical line on the lateral wall of the perforated plug (150; 200; 300);
wherein each opening (170; 220) of the plurality of openings (170; 220) on the lateral wall through which the fluid is able to flow has substantially the same shape;
wherein the plurality of openings (170; 220) and the at least one helical line are arranged such that a ratio between a maximum web width and a minimum web width between adjacent openings of the plurality of openings (170; 220) is greater than or equal to 1 and less than or equal to 1.5;
wherein an arrangement of the plurality of openings (170; 220) and the at least one helical line is chosen to minimize a number of helical lines; and
wherein the following boundary conditions are given:
a predefined inner diameter of the perforated plug (150; 200; 300);
a predefined diameter of each of the plurality of openings (170; 220); and
a predefined minimum web width between the adjacent openings (170; 220), the method comprising:
determining at least one opening (170; 220) of the perforated plug (150; 200; 300) that is to be omitted during the manufacture (440) such that the perforated plug (150; 200; 300) exhibits an equal percentage course of a flow characteristic of the control valve (100); and
manufacturing (440) the perforated plug (150; 200; 300) with the determined plurality of openings (170; 220) on the at least one helical line.

2. The method according to claim 1, wherein the equal percentage course of the flow characteristic of the control valve (100) is produced by:
determining a maximum number of openings that can be arranged on the at least one helical line on the lateral wall of the perforated plug (150; 200; 300) according to claim 1;
determining a required number of openings to obtain a total area of the openings for the flow of the fluid; and
determining a difference between the maximum number of openings and the required number of openings to determine the number of openings (170; 220) of the perforated plug (150; 200; 300) that are to be omitted.

3. The method according to claim 1, wherein the plurality of openings (170; 220) are arranged on at least two helical lines.

4. The method according to claim 1, wherein the plurality of openings (170; 220) are arranged on at most 20 helical lines.

5. The method according to claim 1, wherein the plurality of openings (170; 220) are uniformly arranged along one helical line.

6. The method according to claim 5, wherein the plurality of openings (170; 220) are arranged equidistantly along one helical line.

7. The method according to claim 1, wherein each of the plurality of openings (170; 220) has one of the following cross-sectional shapes: circular; square; rectangular; hexagonal; or star.

8. The method according to claim 1, wherein the number of helical lines is determined using an iterative method (500) comprising the following steps:
step (i): the plurality of openings (220) are first distributed on N=2 helical lines with a minimum height h=πD tan(α),
step (ii): where sin(α)=N cos(30°)(d+s)/(πD), D is the predefined inner diameter of the perforated plug (150; 200; 300), d is the predefined diameter of each of the plurality of openings (220) and s is the predefined minimum web width between the adjacent openings (220);
step (iii): the number of openings (220) on each helical line is first given by an integer value of a ratio: πD/(d+s); and
step (iv): then incrementally increasing the number of openings (220);
step (v): until an orthogonal projection of a position of a first opening of the plurality of openings on a first helical line of the at least one helical line onto a nearest helical line falls into an intermediate region of adjacent openings (220), wherein the intermediate region is defined as a distance of the orthogonal projection to the adjacent openings (220) of at least 30% of the distance between the adjacent openings (220);
step (vi): increasing the number of helical lines N if the web widths do not comply with the predefined minimum web width or a maximum ratio of two web widths between adjacent openings is greater than 1.5; and
step (vii): repeating steps (iii) to (vi) until the web widths comply with the predefined minimum web width and the maximum ratio is greater than or equal to 1 and less than or equal to 1.5.

9. The method according to claim 8, wherein the number of openings (170; 220) to be omitted on the helical lines around the lateral wall of the perforated plug (150; 200; 300) are determined by means of a loop-like method (600);
wherein a maximum possible number of openings (170; 220) around the perforated plug (150; 200; 300) is determined according to claim 8;
wherein a total number of openings (170; 220) to be omitted is determined;
wherein the number of openings (170; 220) is determined that is necessary to obtain a predefined maximum total area of the openings (170; 220); and
wherein the number of openings (170; 220) that is necessary to obtain a predefined maximum total area of the openings (170; 220) is subtracted from the maximum possible number of openings (170; 220) around the perforated plug (150; 200; 300) that is determined according to claim 8 to obtain a difference r;

wherein the difference r is used to determine the number of openings (170; 220) to be omitted on each helical line in a loop starting at the Nth helical line and ending at the first helical line, where the value N is assigned to a counting variable i in the first step and the integer value of the ratio $3r/(2i-2)$ is determined and additionally reduced by 1, and r is subsequently lowered by this value, and the procedure is repeated for a next helical line, such that the number of openings (170; 220) to be omitted does not increase and does not become greater than r.

10. The method according to claim 1, wherein a maximum total area of the plurality of openings (170; 220) is predefined as a boundary condition.

11. A perforated plug (150; 200; 300) for a control valve (100) obtained by the method according to claim 1.

12. A perforated plug (150; 200; 300) for a control valve (100), the control valve (100) being capable of controlling the flow of a fluid, wherein the perforated plug (150; 200; 300) is cup-shaped and has a lateral wall forming a plurality of openings (170; 220) through which the fluid is able to flow;

wherein each opening (170; 220) of the plurality of openings (170; 220) on the lateral wall through which the fluid is able to flow has substantially the same shape;

wherein the plurality of openings (170; 220) are arranged on at least one helical line on the lateral wall of the perforated plug (150; 200; 300);

wherein the plurality of openings (170; 220) and the at least one helical line are arranged such that a ratio between a maximum web width and a minimum web width between adjacent openings of the plurality of openings (170; 220) is greater than or equal to 1 and less than or equal to 1.5;

wherein the perforated plug (150; 200; 300) has a minimum number of helical lines satisfying the latter condition;

wherein the perforated plug (150; 200; 300) is configured such that the perforated plug complies with the following boundary conditions:

a predefined inner diameter of the perforated plug (150; 200; 300);

a predefined diameter of each of the plurality of openings (170; 220); and a minimum web width between the adjacent openings (170; 220); and wherein the perforated plug (150; 200; 300) is configured such that at least one opening (170; 220) is determined before the manufacture (440) of the perforated plug (150; 200; 300) and omitted during the manufacture (440) such that the perforated plug (150; 200; 300) exhibits an equal percentage course of a flow characteristic of the control valve (100).

* * * * *